(12) United States Patent
Matsui

(10) Patent No.: US 10,106,065 B2
(45) Date of Patent: Oct. 23, 2018

(54) VEHICLE SEAT FRAME INCLUDING COLLAR MEMBER AND METHOD OF PRODUCING THE COLLAR MEMBER

(71) Applicants: TOYOTA BOSHOKU KABUSHIKI KAISHA, Aichi-ken (JP); AISIN SEIKI KABUSHIKI KAISHA, Aichi-ken (JP)

(72) Inventor: Hayato Matsui, Aichi-Ken (JP)

(73) Assignees: TOYOTA BOSHOKU KABUSHIKI KAISHA, Aichi-Ken (JP); AISIN SEIKI KABUSHIKI KAISHA, Aichi-Ken (JP)

( * ) Notice: Subject to any disclaimer, the term of this patent is extended or adjusted under 35 U.S.C. 154(b) by 78 days.

(21) Appl. No.: 15/210,400

(22) Filed: Jul. 14, 2016

(65) Prior Publication Data

US 2017/0028892 A1 Feb. 2, 2017

(30) Foreign Application Priority Data

Jul. 31, 2015 (JP) ................................ 2015-151671

(51) Int. Cl.
*A47C 1/00* (2006.01)
*B60N 2/68* (2006.01)
(Continued)

(52) U.S. Cl.
CPC ........... *B60N 2/682* (2013.01); *B21D 35/001* (2013.01); *B21D 53/88* (2013.01); *B60N 2/1615* (2013.01); *B60N 2/68* (2013.01)

(58) Field of Classification Search
CPC .... B60N 2/682; B60N 2/1814; B60N 2/1615; B60N 2/68; B60N 2/1635; B60N 2/72;
(Continued)

(56) References Cited

U.S. PATENT DOCUMENTS

| 5,738,327 A | * | 4/1998 | Tanaka | ................... | B60N 2/067 |
| | | | | | 248/395 |
| 8,857,913 B2 | * | 10/2014 | Schuhmacher | ...... | B60N 2/2356 |
| | | | | | 16/2.1 |

(Continued)

FOREIGN PATENT DOCUMENTS

JP 2004-255405 9/2004
JP 2015-67136 4/2015

*Primary Examiner* — Chi Q Nguyen
(74) *Attorney, Agent, or Firm* — Greenblum & Bernstein, P.L.C.

(57) ABSTRACT

A vehicle seat frame includes a pair of side frames constituting side portions of a seat cushion frame, and a pipe member rotatably fitted at respective end portions in sliding holes of the side frames, thereby coupling the side frames to each other. At least one of the end portions of the pipe member is coupled to the corresponding side frame via a collar member having a cylindrical shape. An outer peripheral portion of the collar member has a sliding contact portion in sliding contact with a peripheral surface of the sliding hole. An inner peripheral portion of the collar member has an insertion-receiving portion into which the corresponding end portion of the pipe member is inserted and to which the corresponding end portion of the pipe member is secured. The dimensional tolerance of the sliding contact portion is set smaller than the dimensional tolerance of the insertion-receiving portion.

6 Claims, 7 Drawing Sheets

(51) Int. Cl.
*B60N 2/16* (2006.01)
*B21D 53/88* (2006.01)
*B21D 35/00* (2006.01)

(58) Field of Classification Search
CPC . B60N 2/06; B60N 2/1864; B60N 2002/0236
USPC .......................... 297/452.18, 344.15, 452.2
See application file for complete search history.

(56) References Cited

U.S. PATENT DOCUMENTS

| | | | | |
|---|---|---|---|---|
| 8,870,293 | B2* | 10/2014 | Seibold | B60N 2/68 |
| | | | | 297/452.18 |
| 9,630,527 | B2* | 4/2017 | Matsui | B60N 2/1615 |
| 2011/0121627 | A1* | 5/2011 | Konagai | B60N 2/4235 |
| | | | | 297/354.1 |
| 2015/0246624 | A1* | 9/2015 | Furuta | B29C 65/7829 |
| | | | | 297/344.15 |
| 2017/0246966 | A1* | 8/2017 | Hayashi | B60N 2/002 |

* cited by examiner

VEHICLE SEAT FRAME INCLUDING COLLAR MEMBER AND METHOD OF PRODUCING THE COLLAR MEMBER

INCORPORATION BY REFERENCE

The disclosure of Japanese Patent Application No. 2015-151671 filed on Jul. 31, 2015 including the specification, drawings and abstract is incorporated herein by reference in its entirety.

BACKGROUND OF THE INVENTION

1. Field of the Invention

The invention relates to a vehicle seat frame including a collar member, and relates also to a method of producing the collar member.

2. Description of Related Art

Some vehicle seat frames are provided with a lifter device configured to adjust the height of a seat cushion. As illustrated in FIG. 8 and FIG. 9, in a lifter device 100 described in Japanese Unexamined Patent Application Publication No. 2015-67136 (JP 2015-67136 A), a side frame 110 of a seat cushion, a front link 120, an upper rail 132 of a slide rail 130, and a rear link 140 constitute a four-bar linkage mechanism. A front lifter mechanism includes a collar 150 having a cylindrical portion 150a and a flange 150b. The cylindrical portion 150a of the collar 150 is passed through a through-hole of the front link 120 and secured to the front link 120 by welding. The outer peripheral surface of a portion of the cylindrical portion 150a of the collar 150, the portion being between the front link 120 and the flange 150b, is in contact with the peripheral surface defining a hole of the side frame 110 and is rotatably supported by the side frame 110. One end portion of a front pipe 160 having an outer diameter that is slightly smaller than the inner diameter of the collar 150 is inserted in the cylindrical portion 150a of the collar 150, and the outer peripheral surface of the front pipe 160 and the collar 150 are secured to each other by welding. A pinion gear 171 rotatably attached to the side frame 110 is meshed with a sector gear 172 coupled to the rear link 140. As the pinion gear 171 is rotated, the rear link 140 pivots in the front-rear direction about a shaft 133 attached to the upper rail 132, so that the side frame 110 moves up and down via the collar 150. At this time, the front link 120 moves in accordance with the movement of the rear link 140, so that the side frame 110 moves up and down while the side frame 110 is kept parallel to the slide rail 130.

Japanese Unexamined Patent Application Publication No. 2004-255405 (JP 2004-255405 A) describes a method of producing such a collar 150 by press working. According to this method, several deep drawing processes are sequentially performed on a flat steel sheet, so that a flange is formed while the diameter of a cylindrical portion is gradually reduced. Finally, a through-hole is formed in a bottom portion of the cylindrical portion. In this way, the collar 150 is produced.

In the technology described in JP 2015-67136 A, the outer diameter of an outer peripheral portion of the cylindrical portion 150a of the collar 150, which is in contact with the peripheral surface defining the hole of the side frame 110, and the inner diameter of an inner peripheral portion of the cylindrical portion 150a of the collar 150, which is in contact with the outer peripheral surface of the front pipe 160, are both formed to have high dimensional accuracy. The production method described in JP 2004-255405 A is employed to produce the collar 150. The production method achieves high dimensional accuracy of both the outer diameter and inner diameter of the cylindrical portion 150a. However, the production method requires at least four steps, and each step is time-consuming. This may increase the production cost.

SUMMARY OF THE INVENTION

The invention provides a method of producing a collar member of a vehicle seat frame, the method making it possible to reduce cost by producing the collar member efficiently while achieving sufficient dimensional accuracy of a prescribed portion of the collar member, and the invention also provides a vehicle seat frame including the collar member.

A first aspect of the invention relates to a vehicle seat frame including a collar member. The vehicle seat frame includes: a pair of side frames constituting side portions of a seat cushion frame; and a pipe member rotatably fitted at respective end portions in sliding holes of the side frames, the pipe member coupling the side frames to each other. At least one of the end portions of the pipe member is coupled to the corresponding side frame via a collar member having a cylindrical shape. An outer peripheral portion of the collar member has a sliding contact portion that is in sliding contact with a peripheral surface of the sliding hole. An inner peripheral portion of the collar member has an insertion-receiving portion into which the corresponding end portion of the pipe member is inserted and to which the corresponding end portion of the pipe member is secured. The dimensional tolerance of the sliding contact portion is set smaller than the dimensional tolerance of the insertion-receiving portion.

According to the first aspect, in the collar member, the dimensional tolerance of the sliding contact portion of the outer peripheral portion, which is brought into sliding contact with the peripheral surface of the sliding hole of the side frame needs to be set smaller than the dimensional tolerance of the insertion-receiving portion of the inner peripheral portion into which the corresponding end portion of the pipe member is inserted and to which the corresponding end portion of the pipe member is secured. Thus, it is possible to facilitate production of the collar member, thereby lowering the cost, as compared with the case where the dimensional tolerance of the insertion-receiving portion is set equal to the dimensional tolerance of the sliding contact portion. The dimensional tolerance of the insertion-receiving portion can be set larger than the dimensional tolerance of the sliding contact portion for the following reason: The side frame is brought into contact with the sliding contact portion and rotates with respect to the sliding contact portion. In contrast to this, the pipe member is inserted into and secured to the insertion-receiving portion. In view of this, the basic dimension of the insertion-receiving may be set slightly larger than the outer diameter of the pipe member such that the pipe member is loosely fitted in the insertion-receiving portion.

In the first aspect, the collar member may have a cylindrical portion and a flange provided at a first end of the cylindrical portion, the sliding contact portion may be provided between the flange and a center of the cylindrical portion in a longitudinal direction of the cylindrical portion, and the insertion-receiving portion may be provided between the center of the cylindrical portion in the longitudinal direction and a second end of the cylindrical portion where the flange is not provided.

In the above configuration, the sliding contact portion where the dimensional tolerance needs to be kept small is formed in the region smaller than half the length of the cylindrical portion. This further facilitates the production of the collar member, thereby further lowering the cost.

A dimensional tolerance of the outer peripheral portion of the collar member may be set to be gradually increased from an end of the sliding contact portion, the end being on an opposite side of the sliding contact portion from the flange, toward the second end of the cylindrical portion where the flange is not provided.

In the above configuration, the dimensional tolerance of the outer peripheral portion of the collar member is no longer necessary to be strictly controlled, in a region from the end of the sliding contact portion, the end being on the opposite side of the sliding contact portion from the flange, to the second end of the cylindrical portion where the flange is not provided. This further facilitates the production of the collar member, thereby further lowering the cost.

In the first aspect, a plurality of the collar members may be provided, the collar members may be fitted to the respective end portions of the pipe member, and link members of a lifter mechanism configured to move the seat cushion frame up and down with respect to a floor may be attached to the respective collar members.

With this configuration, the seat cushion frame is allowed to move smoothly when the lifter mechanism is provided.

A second aspect of the invention relates to a method of producing a collar member for a vehicle seat frame. The vehicle seat frame includes: a pair of side frames constituting side portions of a seat cushion frame; and a pipe member rotatably fitted at respective end portions in sliding holes of the side frames, the pipe member coupling the side frames to each other. At least one of the end portions of the pipe member is coupled to the corresponding side frame via a collar member having a cylindrical shape. An outer peripheral portion of the collar member has a sliding contact portion that is in sliding contact with a peripheral surface of the sliding hole. An inner peripheral portion of the collar member has an insertion-receiving portion into which the corresponding end portion of the pipe member is inserted and to which the corresponding end portion of the pipe member is secured. A dimensional tolerance of the sliding contact portion is set smaller than a dimensional tolerance of the insertion-receiving portion. The collar member has a cylindrical portion and a flange provided at a first end of the cylindrical portion. The sliding contact portion is provided between the flange and a center of the cylindrical portion in a longitudinal direction of the cylindrical portion. The insertion-receiving portion is provided between the center of the cylindrical portion in the longitudinal direction and a second end of the cylindrical portion where the flange is not provided. The method includes: forming a first workpiece having a downwardly-convex domical shape from a sheet material made of metal, by placing the sheet material on a lower die having a cylinder hole with an inner diameter equal to an outer diameter of the cylindrical portion, the cylinder hole being opened upward, such that the cylinder hole is covered with the sheet material, then moving an upper die downward to clamp, at an outer periphery of the cylinder hole, the sheet material between the lower die and the upper die, and then pushing, from above, an outer-diameter-forming punch having a rounded distal end into the cylinder hole, a peripheral surface of the cylinder hole of the lower die and an outer peripheral surface of the outer-diameter-forming punch being brought into tight contact with the first workpiece, within a region extending from an opening of the cylinder hole and having a length equal to or smaller than half of a length of the cylindrical portion of the collar member (first step); forming a second workpiece by providing a circular hole in a top portion of a domical portion of the first workpiece such that a center of the circular hole coincides with an axis of the cylinder hole (second step); and pushing an inner-diameter-forming punch having an outer diameter equal to an inner diameter of the cylindrical portion of the collar member, into the second workpiece having a cylindrical shape, to adjust an inner diameter of the inner peripheral portion of the collar member (third step).

According to the second aspect, in the first step, in the region extending from the opening of the cylinder hole of the lower die and having a length equal to or smaller than half the length of the cylindrical portion of the collar member, the sheet material is firmly pressed against the peripheral surface of the cylinder hole and the outer peripheral surface of the outer-diameter-forming punch. Thus, in the region extending from the opening of the cylinder hole of the lower die and having a length equal to or smaller than half the length of the cylindrical portion of the collar member, the sheet material is firmly pressed against the peripheral surface of the cylinder hole of the lower die, so that an outer diameter equal to the inner diameter of the cylinder hole of the lower die is formed. That is, a collar member having a sliding contact portion with a small dimensional tolerance is formed. In addition, in the third step, the dimensional tolerance of the insertion-receiving portion of the inner peripheral portion of the collar member is set to a dimensional tolerance that is larger than the dimensional tolerance of the sliding contact portion but that does not cause any problem in inserting the end portion of the pipe member into the insertion-receiving portion. This production method requires only a small number of steps, and it is no longer necessary to perform stamping several times to reduce the diameter. Thus, the time required for each step is reduced, and it is possible to reduce the cost by producing the collar member efficiently.

In the second aspect, a dimensional tolerance of the outer peripheral portion of the collar member may be set to be gradually increased from an end of the sliding contact portion, the end being on an opposite side of the sliding contact portion from the flange, toward the second end of the cylindrical portion where the flange is not provided.

In the above configuration, the dimensional tolerance of the outer peripheral portion of the collar member is no longer necessary to be strictly controlled, in a region from the end of the sliding contact portion, the end being on the opposite side of the sliding contact portion from the flange, to the second end of the cylindrical portion where the flange is not provided. This further facilitates the production of the collar member, thereby further lowering the cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
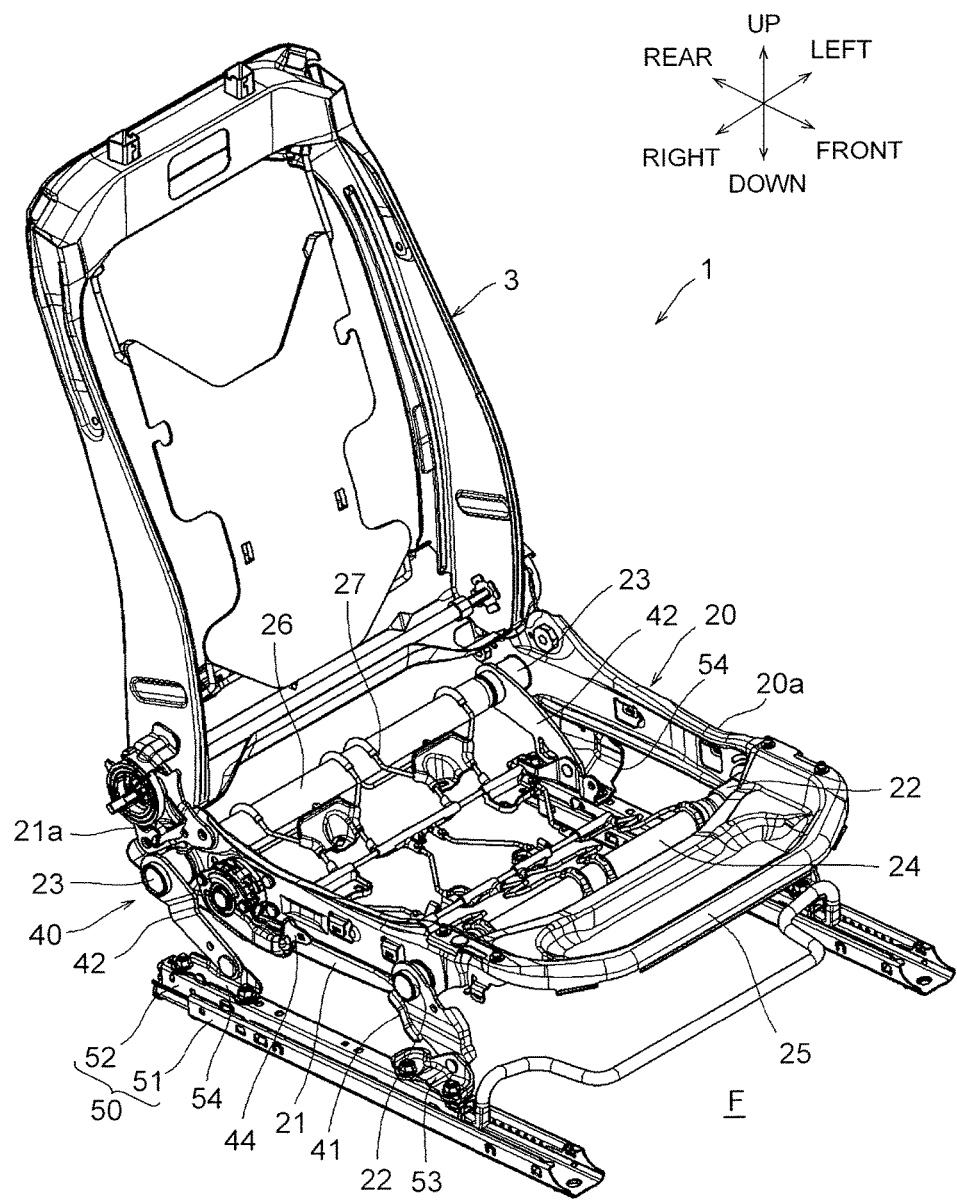
FIG. 1 is a perspective view of a vehicle seat frame according to an embodiment of the invention.
Figure 2:
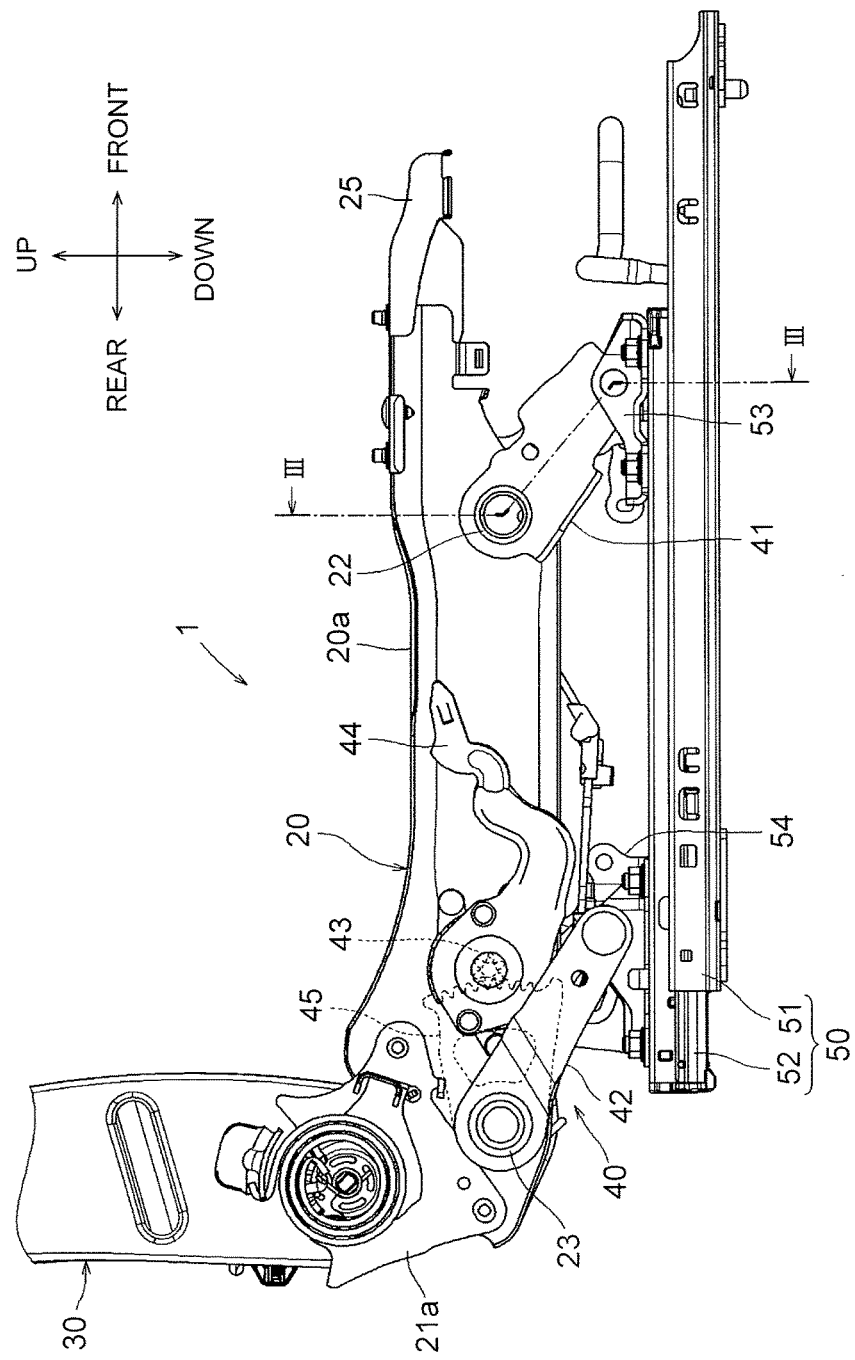
FIG. 2 is a side view of a lifter mechanism in the embodiment.
Figure 3:
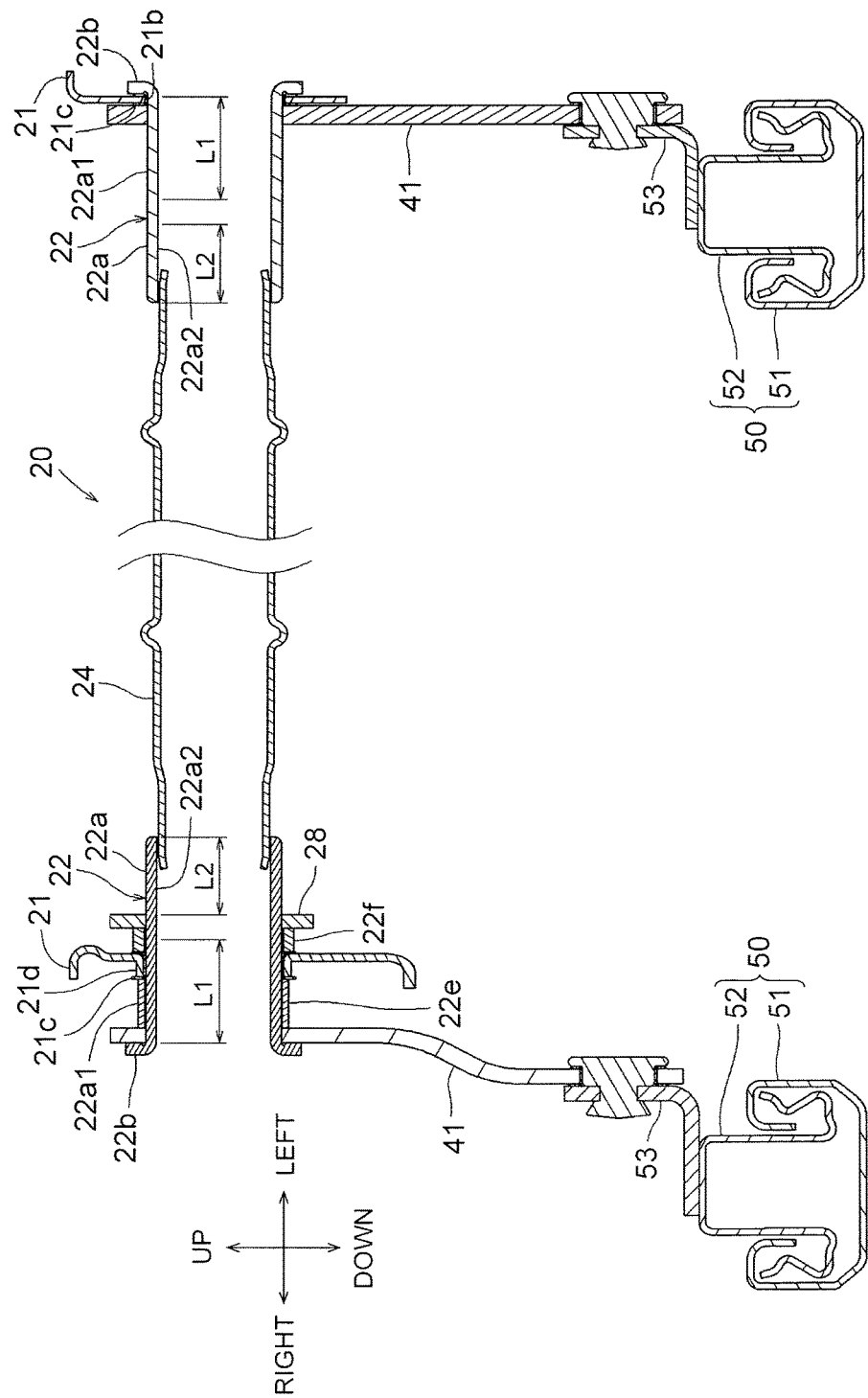
FIG. 3 is a sectional view taken along the line in FIG. 2.

FIGS. 1 to 3 illustrate a vehicle seat frame according to an embodiment of the invention. FIGS. 1 to 3 illustrate the vehicle seat frame mounted in a vehicle, and arrows in the drawings indicate the directions with respect to the vehicle including the vehicle seat frame. In this specification, description relating to the directions will be provided with reference to the directions in the drawings. A vehicle seat frame 1 according to the present embodiment includes a seat cushion frame 20 and a seatback frame 3. A headrest frame is fitted to an upper portion of the seatback frame 3, but illustration of the headrest frame is omitted. The seatback frame 3 and the headrest frame have known configurations, and thus description thereof is omitted. The seat cushion frame 20 will be described in detail below. The vehicle seat frame 1 is an example of "vehicle seat frame".

As illustrated in FIG. 1, the seat cushion frame 20 includes a body 20a, a pair of slide rails 50, and a lifter mechanism 40. A cushion pad is disposed on the body 20a. The slide rails 50 are secured to a floor F so as to extend in the front-rear direction. The lifter mechanism 40 is configured to move the body 20a up and down with respect to the slide rails 50.

The body 20a includes a pair of side frames 21 extending in the front-rear direction. The side frames 21 are at the right and left sides of the body 20a. A front collar 22 having a cylindrical shape is rotatably attached to a front side portion of each side frame 21, and a rear collar 23 having a cylindrical shape is rotatably attached to a rear side portion of each side frame 21. Inside the seat frame, the right and left front collars 22 are coupled to each other via a front pipe 24 that is coaxial with the front collars 22. Further, inside the seat frame, the right and left rear collars 23 are coupled to each other via a rear pipe 26 that is coaxial with the rear collars 23. A front panel 25 is attached to front side portions of the side frames 21. Thus, the right and left side frames 21 are coupled to each other so as to face each other at a prescribed distance. In this way, the body 20a having a generally rectangular shape as viewed from above is provided. The front collar 22 is an example of "collar member", and the front pipe 24 is an example of "pipe member".

A zigzag spring 27 is attached to the front pipe 24 and the rear pipe 26 so as to be extended therebetween. The zigzag spring 27 supports the center and rear portions of the cushion pad from below. The zigzag spring 27 is a member formed by partially integrating springs, obtained by bending wires, together with resin. The zigzag spring 27 is hooked onto the front pipe 24 and the rear pipe 26 via resin members, thereby being held so as to be rotatable with respect to the front pipe 24 and the rear pipe 26. Thus, even when the front pipe 24 and the rear pipe 26 are rotated due to adjustment of the height of the seat cushion frame 20 performed by the lifter mechanism 40 (described later in detail), the engagement of the zigzag spring 27 with the front pipe 24 and the rear pipe 26 is maintained to stably support the cushion pad.

A reclining plate 21a is attached to a rear side portion of each side frame 21 with bolts and nuts. Right and left lower end portions of the seatback frame 3 are attached to the reclining plates 21a via a recliner (not illustrated). The angle of the seatback frame 3 with respect to the seat cushion frame 20 is adjusted by operating the recliner.

Each slide rail 50 includes a lower rail 51 and an upper rail 52. The lower rail 51 is secured to the floor F so as to extend in the front-rear direction. The upper rail 52 is slidably assembled to the lower rail 51. The slide rail 50 has a function of adjusting the position of the seat cushion frame 20 with respect to the floor F in the front-rear direction. A front bracket 53 is attached to a front end portion of each upper rail 52. The front bracket 53 supports a lower end portion of a front link 41 (described later in detail) such that the front link 41 is pivotable in the up-down direction. Further, a rear bracket 54 is attached to a rear end portion of each upper rail 52. The rear bracket 54 supports a lower end portion of a rear link 42 (described later in detail) such that the rear link 42 is pivotable in the up-down direction. The front link 41 is an example of "link member".

As illustrated in FIG. 1 and FIG. 2, the lifter mechanism 40 includes a pair of the right and left front links 41, a pair of the right and left rear links 42, a pinion gear 43 and a lifter lever 44 that are operably attached to the right side frame 21, and a sector gear 45. Each of the right and left front links 41 is secured at its upper end portion to the front collar 22, and is supported at its lower end portion by the front bracket 53 so as to be pivotable in the up-down direction. Further, each of the right and left rear links 42 is secured at its upper end portion to the rear collar 23, and is supported at its lower end portion by the rear bracket 54 so as to be pivotable in the up-down direction. The sector gear 45 is secured to a left end portion of the right rear collar 23 (i.e., an inner end portion of the right rear collar 23 in the seat lateral direction). The sector gear 45 is made of a steel sheet having a generally sector shape. The sector gear 45 has a toothed arc-shaped portion, and a main portion having a hole through which the rear collar 23 is passed. The sector gear 45 is disposed so as to be meshed with the pinion gear 43 operably attached to the right side frame 21. As the lifter lever 44 attached to the right side frame 21 is operated in the up-down direction, the pinion gear 43 rotates. In response to the rotation of the pinion gear 43, the right rear collar 23 rotates via the sector gear 45 and the right rear link 42 pivots in the up-down direction with respect to the rear bracket 54 attached to the upper rail 52. At the same time, the rotation of the right rear collar 23 is transmitted to the left rear collar 23 through the rear pipe 26, so that the left rear link 42 pivots in the up-down direction with respect to the rear bracket 54 attached to the upper rail 52. At this time, the right and left front links 41 pivot in the up-down direction in accordance with the movement of the right and left rear links 42. This is because the side frame 21, the front link 41, the upper rail 52, and the rear link 42 constitute a four-bar linkage mechanism on each of the right side and the left side. Thus, the seat cushion frame 20 moves up and down while the seat cushion frame 20 is kept substantially parallel to the floor F. The front collar 22 is an example of "collar member".

With reference to FIG. 3, a structure for attaching the front link 41, the side frame 21, and the front pipe 24 to the front collar 22 will be described in detail. Each front collar 22 is a flanged cylindrical member made of steel. Each front collar 22 has a cylindrical portion 22a and a flange 22b provided at a first end of the cylindrical portion 22a. A part of the outer peripheral portion of the cylindrical portion 22a extends from substantially the center of the outer peripheral portion in the lateral direction to the boundary with the flange 22b, and this part has a length L1. This part of the outer peripheral portion is formed as a sliding contact portion 22a1 with a dimensional tolerance t (about 0.3% of the outer diameter). The cylindrical portion 22a is formed such that the dimensional tolerance is set to gradually increase within a range from t to 2t (from about 0.3% to about 0.6% of the outer diameter) in a direction from an end of the sliding contact portion 22a1, the end being on the opposite side of the sliding contact portion 22a1 from the flange 22b, toward a second end of the cylindrical portion 22a where the flange 22b is not provided. A part of the inner peripheral portion of the cylindrical portion 22a extends from the second end of the cylindrical portion 22a where the flange 22b is not provided toward the flange 22b side, and this part has a length L2 that is about one-third of the length of the cylindrical portion 22a in the lateral direction. This part of the inner peripheral portion is formed as an insertion-receiving portion 22a2 with a dimensional tolerance 2t (about 0.8% of the inner diameter). The length L1 of the sliding contact portion 22a1 of each of the right and left front collars 22 is set such that the sliding contact portion 22a1 covers a region where the side frame 21 can be brought into contact with the front collar 22.

The sliding contact portion 22a1 on the right side of the flange 22b of the left front collar 22 is fitted in a through-hole 21b of the side frame 21, with the peripheral surface of the through-hole 21b covered with a bushing 21c obtained through a low-friction process, such as a fluororesin-coating process. The front link 41 is secured, by welding, to a portion of the sliding contact portion 22a1 on the right side of the side frame 21, such that the sliding contact portion 22a1 is passed through a hole in the upper end portion of the front link 41. Thus, the side frame 21 is prevented from moving in the lateral direction. The bushing 21c is formed by subjecting one side of a thin metal sheet to a low-friction process, such as a fluororesin-coating process, such that the peripheral surface of the through-hole 21b is covered with the bushing 21c. The bushing 21c is formed such that the one side that has been subjected to a low-friction process, such as a fluororesin-coating process, is in contact with the front link 41, the sliding contact portion 22a1, and the flange 22b. The bushing 21c allows the side frame 21 to smoothly pivot with respect to the front link 41 and the front collar 22. A left end portion of the front pipe 24 is inserted into the insertion-receiving portion 22a2 that is a right side portion of the cylindrical portion 22a of the left front collar 22, and the left end portion of the front pipe 24 is secured to the insertion-receiving portion 22a2 by welding. The through-hole 21b is an example of "sliding hole".

The front link 41 is secured, by welding, to a portion of the sliding contact portion 22a1 on the left side of the flange 22b of the right front collar 22, such that the sliding contact portion 22a1 is passed through a hole in the upper end portion of the front link 41. Further, a burring portion (flange) 21d of the side frame 21 is disposed on the sliding contact portion 22a1 at a position slightly rightward of the center of the cylindrical portion 22a of the right front collar 22 in the lateral direction, such the burring portion 21d is provided with a bushing 21c having a surface subjected to a low-friction process, such as a fluororesin-coating process. Furthermore, a securing member 28 is attached the cylindrical portion 22a of the right the front collar 22 at a position slightly leftward of the center of the cylindrical portion 22a in the lateral direction. A spacer 22e is disposed between the burring portion 21d of the side frame 21 and the front link 41, and a spacer 22f is disposed between the burring portion 21d of the side frame 21 and the securing member 28, so that the side frame 21 is prevented from moving in the lateral direction. The bushing 21c allows the side frame 21 to smoothly pivot with respect to the front collar 22, the spacer 22e, and the spacer 22f. A right end portion of the front pipe 24 is inserted into the insertion-receiving portion 22a2 that is a left side portion of the cylindrical portion 22a of the right front collar 22, and the right end portion of the front pipe 24 is secured to the insertion-receiving portion 22a2 by welding. A hole defined by the burring portion 21d is an example of "sliding hole".

Figure 4:
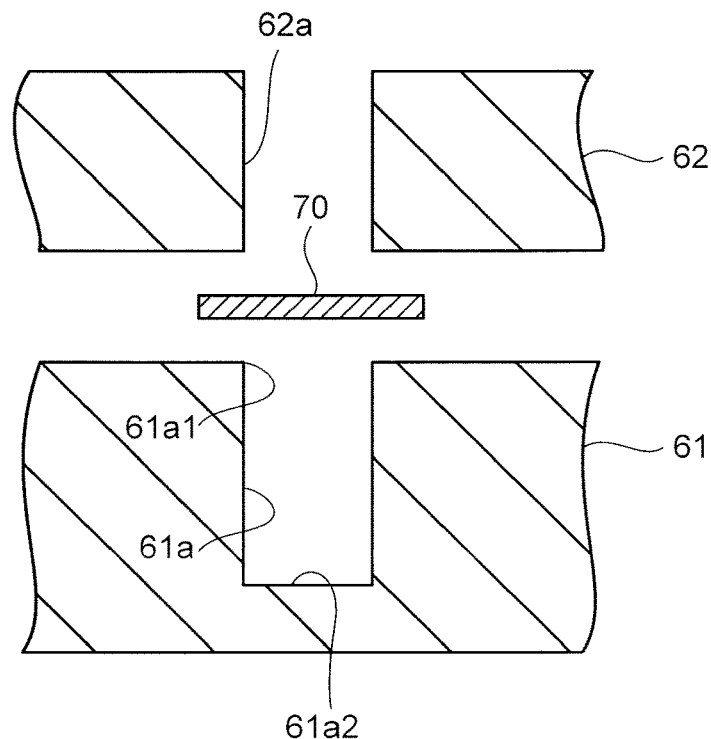
FIG. 4 is a view illustrating a first stage of a first step in a method of producing a collar member of the vehicle seat frame in the embodiment.
Figure 5:
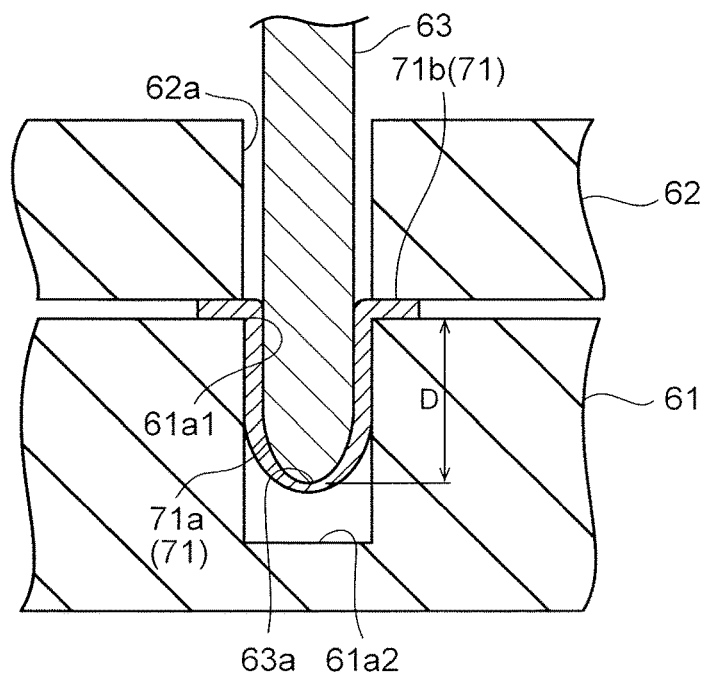
FIG. 5 is a view illustrating a second stage of the first step in the method of producing the collar member of the vehicle seat frame in the embodiment.

With reference to FIG. 4 to FIG. 7, a method of producing the front collar 22 will be described. As illustrated in FIG. 4 and FIG. 5, in a first step, a lower die 61, an upper die 62, and an outer-diameter-forming punch 63 are used. The lower die 61 has a cylinder hole 61a having an inner diameter equal to the outer diameter of the cylindrical portion 22a of the front collar 22. The upper die 62 has a through-hole 62a coaxial with the cylinder hole 61a and having a diameter equal to the diameter of the cylinder hole 61a. The outer-diameter-forming punch 63 has a rounded portion 63a at its distal end. The upper die 62 is configured to move up and down with respect to the lower die 61 with the cylinder hole 61a and the through-hole 62a kept coaxial with each other. A sheet material 70 made of metal and having a disc shape is a sheet material having a thickness T. The sheet material 70 is placed on the lower die 61 so as to cover an opening 61a1 of the cylinder hole 61a. After the upper die 62 is moved down, the sheet material 70 is clamped and held between the upper die 62 and the lower die 61. In this state, the outer-diameter-forming punch 63 is pushed downward while the rounded portion 63a of the outer-diameter-forming punch 63 is pressed against the sheet material 70 with the outer-diameter-forming punch 63 kept coaxial with the through-hole 62a and the cylinder hole 61a, until the lowermost end of the rounded portion 63a reaches a depth D from the opening 61a1. The outer diameter of the outer-diameter-forming punch 63 is set to a value obtained by subtracting 2×0.9T from the inner diameter of the cylinder hole 61a. Thus, in a region from the opening 61a1 to a depth of 0.5 D, the sheet material 70 is stretched with the sheet material 70 kept in tight contact with the peripheral surface of the cylinder hole 61a and the outer peripheral surface of the outer-diameter-forming punch 63. In a region deeper than the depth of 0.5 D, the sheet material 70 is stretched with the sheet material 70 kept in tight contact with only the outer peripheral surface of the outer-diameter-forming punch 63 and with the sheet material 70 kept apart from the peripheral surface of the cylinder hole 61a. Thus, in the region from the opening 61a1 to the depth of 0.5 D, the sheet material 70 is firmly pressed against the peripheral surface of the cylinder hole 61a, so that an outer diameter equal to the inner diameter of the cylinder hole 61a of the lower die 61 is formed. That is, a sliding contact portion with a small dimensional tolerance is formed. A first workpiece 71 formed through the first step has a domical portion 71a having a downwardly-convex cylindrical domical shape, and a flange 71b formed at an opening end portion of the domical portion 71a.

Figure 6:
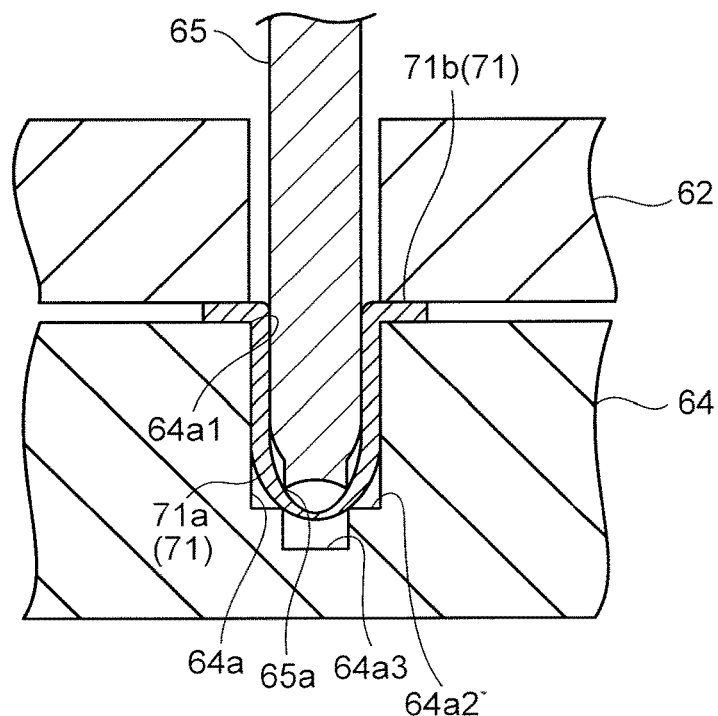
FIG. 6 is a view illustrating a second step in the method of producing the collar member of the vehicle seat frame in the embodiment.

As illustrated in FIG. 6, in a second step, a lower die 64, the upper die 62, and a cutting punch 65 are used. In the lower die 64, a cutting hole 64a3 is formed in a bottom surface 64a2 of a cylinder hole 64a having an inner diameter equal to that of the cylinder hole 61a. The cutting hole 64a3 is coaxial with the cylinder hole 64a and has a diameter smaller than that of the cylinder hole 64a. The cutting punch 65 has a cutting blade 65a at its distal end. The diameter of the cutting hole 64a3 is set to about half the diameter of the cylinder hole 61a. The upper die 62 is configured to move up and down with respect to the lower die 64 with the cylinder hole 64a and the through-hole 62a kept coaxial with each other. The flange 71b of the first workpiece 71 is clamped between the lower die 64 and the upper die 62 with the domical portion 71a of the first workpiece 71 placed in the cylinder hole 64a of the lower die 64. In this state, the cutting punch 65 is moved downward, from above, into the domical portion 71a of the first workpiece 71 with the cutting punch 65 and the first workpiece 71 kept coaxial with each other, and the cutting punch 65 is further moved downward with the distal end portion of the domical portion 71a sandwiched between the corner portion of the cutting hole 64a3 and the cutting blade 65a. As a result, a hole is formed in the distal end portion of the domical portion 71a. This hole has a circular shape having the center that coincides with the axis of the domical portion 71a. The diameter of this hole is equal to the inner diameter of the cutting hole 64a3. A second workpiece 72 formed through the second step has a domical portion 72a having a downwardly-convex cylindrical domical shape having a circular hole at its distal end, and a flange 72b formed at an opening end portion of the domical portion 72a.

Figure 7:
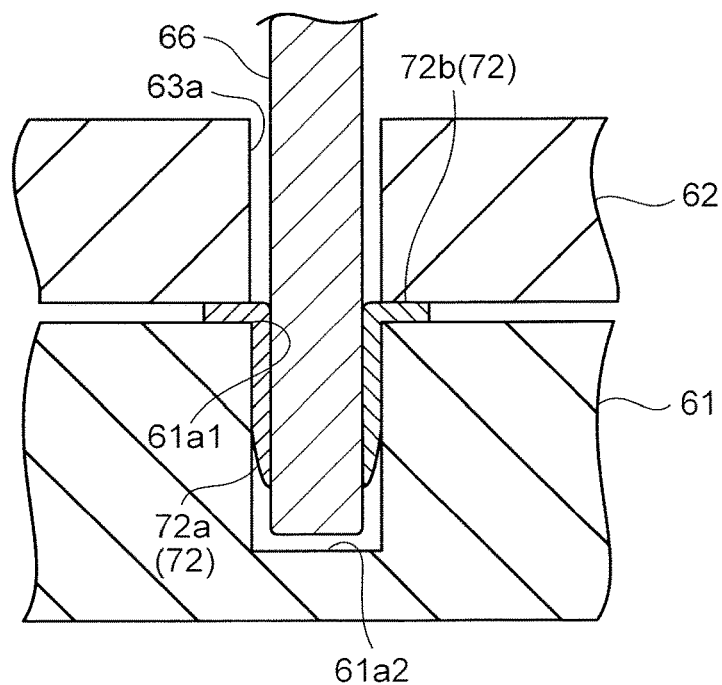
FIG. 7 is a view illustrating a third step in the method of producing the collar member of the vehicle seat frame in the embodiment.
Figure 8:
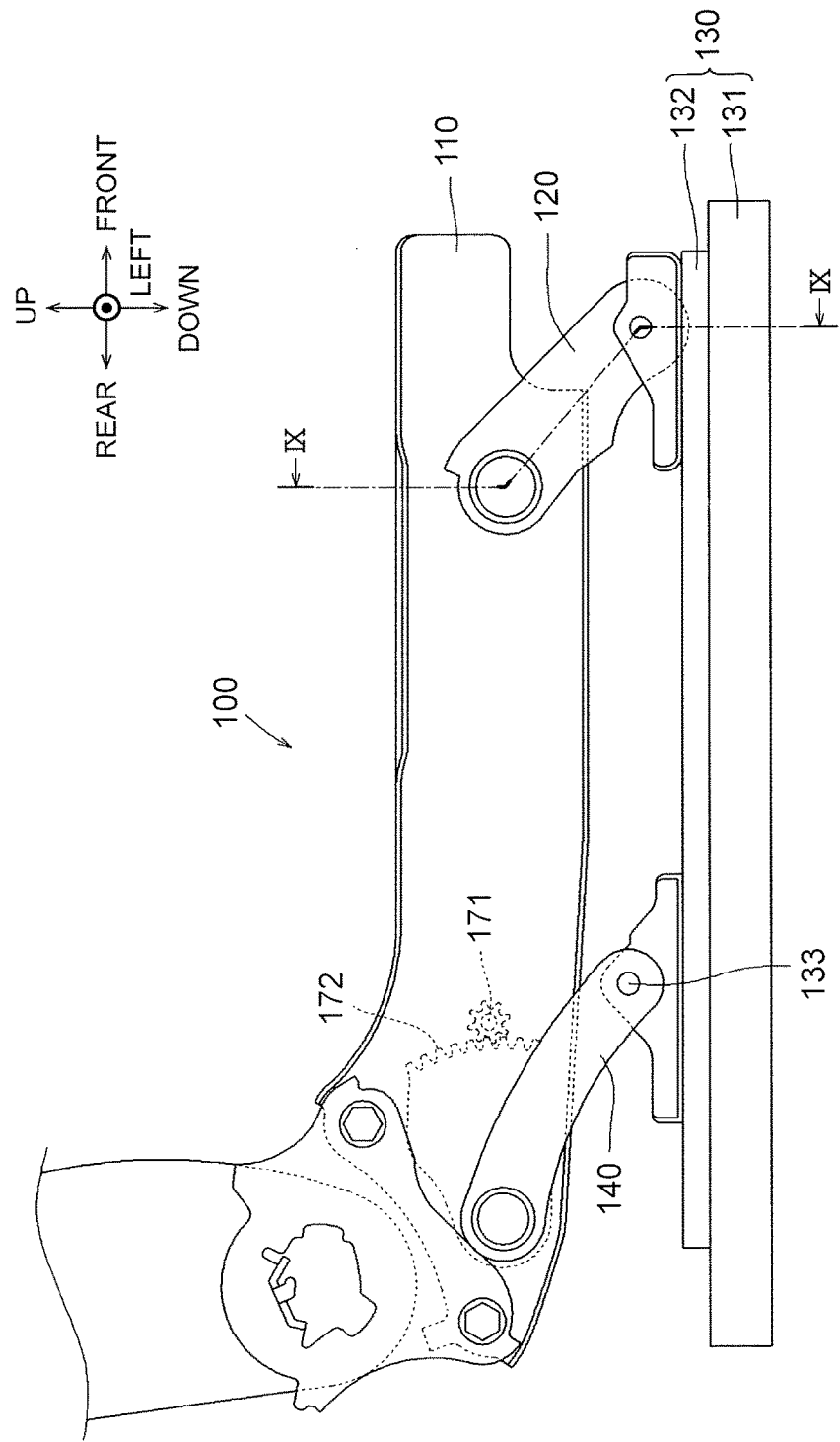
FIG. 8 is a side view of a seat cushion frame in related art.
Figure 9:
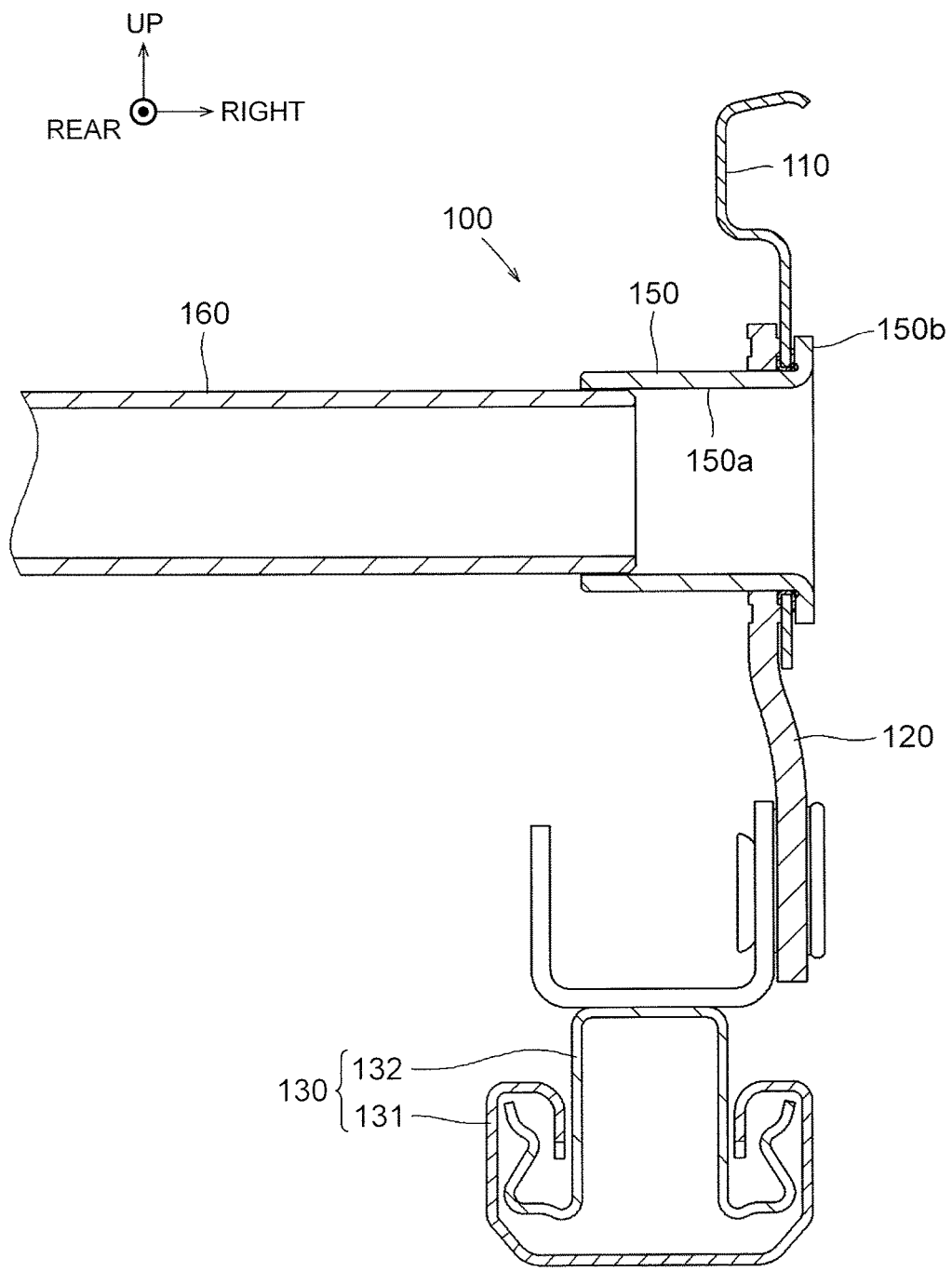
FIG. 9 is a sectional view taken along the line IX-IX in FIG. 8.

As illustrated in FIG. 7, in a third step, the lower die 61, the upper die 62, and an inner-diameter-forming punch 66 are used. The outer diameter of the inner-diameter-forming punch 66 is equal to the inner diameter of the insertion-receiving portion 22a2 of the cylindrical portion 22a of the front collar 22. The inner-diameter-forming punch 66 has a generally columnar shape, in a section taken along a plane including the axis of the inner-diameter-forming punch 66. The corner of a lower end portion of the inner-diameter-forming punch 66 is rounded. The upper die 62 is configured to move up and down with respect to the lower die 61 with the cylinder hole 61a and the through-hole 62a kept coaxial with each other, as in the first step. The flange 72b of the second workpiece 72 is clamped between the lower die 61 and the upper die 62 with the domical portion 72a of the second workpiece 72 placed in the cylinder hole 61a of the lower die 61. In this state, the inner-diameter-forming punch 66 is moved downward, from above, into the domical portion 72a of the second workpiece 72 with the inner-diameter-forming punch 66 and the second workpiece 72 kept coaxial with each other, so that the hole in the distal end portion of the domical portion 72a is expanded. Thus, the inner diameter of the domical portion 72a of the second workpiece 72, which is not in tight contact with the peripheral surface of the cylinder hole 61a, is adjusted to a value substantially equal to the outer diameter of the inner-diameter-forming punch 66. The inner diameter of the domical portion 72a of the second workpiece 72, which is not in tight contact with the peripheral surface of the cylinder hole 61a, is adjusted by bringing the domical portion 72a into tight contact only with the outer peripheral surface of the inner-diameter-forming punch 66. Thus, a tight contact pressure applied to the domical portion 72a is low, and the dimensional tolerance of the domical portion 72a is larger than that of a portion of the second workpiece 72, which is in tight contact with the peripheral surface of the cylinder hole 61a.

The foregoing embodiment produces the following advantageous effects. In the front collar 22, the dimensional tolerance of the sliding contact portion 22a1, which is brought into sliding contact with the peripheral surface of the through-hole 21b or the burring portion 21d of the side frame 21 needs to be set smaller than the dimensional tolerance of the insertion-receiving portion 22a2. Thus, it is possible to facilitate production of the front collar 22, thereby lowering the cost, as compared with the case where the dimensional tolerance of the insertion-receiving portion 22a2 is set equal to the dimensional tolerance of the sliding contact portion 22a1. Further, the sliding contact portion 22a1 is formed in a region smaller than half the length of the cylindrical portion 22a. Thus, a portion where the dimensional tolerance needs to be kept small is narrow. This further facilitates the production of the front collar 22, thereby further lowering the cost. Furthermore, in a region from the end of the sliding contact portion 22a1, the end being on the opposite side of the sliding contact portion 22a1 from the flange 22b, to the second end of the cylindrical portion 22a where the flange 22b is not provided, the dimensional tolerance of the outer peripheral portion of the cylindrical portion 22a is no longer necessary to be strictly controlled. This further facilitates the production of the front collar 22, thereby further lowering the cost.

According to the method of producing the front collar 22, in the first step, in the region from the opening 61a1 of the cylinder hole 61a of the lower die 61 to the depth of 0.5 D from the opening 61a1, the sheet material 70 is firmly pressed against the peripheral surface of the cylinder hole 61a to be turned into the sliding contact portion 22a 1. Thus, the form of the peripheral surface of the cylinder hole 61a of the lower die 61 is substantially entirely transferred to the sliding contact portion 22a 1. Therefore, the dimensional tolerance is set to a small dimensional tolerance t. Then, in the third step, the domical portion 72a of the second workpiece 72 is expanded in the radial direction by the inner-diameter-forming punch 66 to be turned into the insertion-receiving portion 22a2 having an inner diameter that is substantially equal to the outer diameter of the inner-diameter-forming punch 66. The inner diameter of the insertion-receiving portion 22a2 is achieved only by a pressing force from the outer peripheral surface of the inner-diameter-forming punch 66. Thus, a tight contact pressure for forming the insertion-receiving portion 22a2 is low, and the dimensional tolerance of the insertion-receiving portion 22a2 is about 2t, which is larger than that of the sliding contact portion 22a 1. This production method requires only a small number of steps, and it is no longer necessary to perform stamping several times to reduce the diameter. Thus, the time required for each step is reduced, and it is possible to reduce the cost by producing the front collar 22 efficiently.

While one embodiment of the invention has been described above, various changes and modifications may be made to the foregoing embodiment within the scope of the invention. For example, the following changes and Modifications may be made to the foregoing embodiment.

In the foregoing embodiment, the invention is applied to the front collar 22. Alternatively, the invention may be applied to the rear collar 23. Further, it is not necessary to apply the invention to both of the right and left front collars 22 or both of the right and left rear collars 23. The invention may be applied to only one of the right and left front collars 22 or only one of the right and left rear collars 23.

In the foregoing embodiment, a workpiece obtained from the sheet material 70 having a disc shape is placed sequentially in different dies for the respective steps to produce the front collar 22. Alternatively, dies for the respective steps may be arranged in line in a single stamping machine, that is, a transfer press method may be employed. In this case, a sheet material having a strip shape is used, and the flange 22b is formed through stamping after the completion of the third step.

In the foregoing embodiment, the invention is applied to the vehicle seat. Alternatively, the invention may be applied to seats mounted in aircrafts, vessels, trains, and the like.

What is claimed is:

1. A vehicle seat frame including a collar member, the vehicle seat frame comprising:
    a pair of side frames constituting side portions of a seat cushion frame; and
    a pipe member rotatably fitted at respective end portions in sliding holes of the side frames, the pipe member coupling the side frames to each other, wherein
    at least one of the end portions of the pipe member is coupled to the corresponding side frame via the collar member having a cylindrical shape,
    an outer peripheral portion of the collar member has a sliding contact portion that is in sliding contact with a peripheral surface of the sliding hole,
    an inner peripheral portion of the collar member has an insertion-receiving portion into which the corresponding end portion of the pipe member is inserted and to which the corresponding end portion of the pipe member is secured, and
    a dimensional tolerance of the sliding contact portion is smaller than a dimensional tolerance of the insertion-receiving portion.

2. The vehicle seat frame according to claim 1, wherein:
    the collar member has a cylindrical portion and a flange provided at a first end of the cylindrical portion;
    the sliding contact portion is provided between the flange and a center of the cylindrical portion in a longitudinal direction of the cylindrical portion; and
    the insertion-receiving portion is provided between the center of the cylindrical portion in the longitudinal direction and a second end of the cylindrical portion where the flange is not provided.

3. The vehicle seat frame according to claim 2, wherein a dimensional tolerance of the outer peripheral portion of the collar member gradually increases from an end of the sliding contact portion, the end being on an opposite side of the sliding contact portion from the flange, toward the second end of the cylindrical portion where the flange is not provided.

4. A method of producing a collar member for a vehicle seat frame of claim 2, the method comprising:
    forming a first workpiece having a downwardly-convex domical shape from a sheet material made of metal, by placing the sheet material on a lower die having a cylinder hole with an inner diameter equal to an outer diameter of the cylindrical portion, the cylinder hole being opened upward, such that the cylinder hole is covered with the sheet material, then moving an upper die downward to clamp, at an outer periphery of the cylinder hole, the sheet material between the lower die and the upper die, and then pushing, from above, an outer-diameter-forming punch having a rounded distal end into the cylinder hole,
        a peripheral surface of the cylinder hole of the lower die and an outer peripheral surface of the outer-diameter-forming punch being brought into tight contact with the first workpiece, within a region extending from an opening of the cylinder hole and having a length equal to or smaller than half of a length of the cylindrical portion of the collar member;
    forming a second workpiece by providing a circular hole in a top portion of a domical portion of the first workpiece such that a center of the circular hole coincides with an axis of the cylinder hole; and
    pushing an inner-diameter-forming punch having an outer diameter equal to an inner diameter of the cylindrical portion of the collar member, into the second workpiece having a cylindrical shape, to adjust an inner diameter of the inner peripheral portion of the collar member.

5. The method according to claim 4, wherein a dimensional tolerance of the outer peripheral portion of the collar member gradually increases from an end of the sliding contact portion, the end being on an opposite side of the sliding contact portion from the flange, toward the second end of the cylindrical portion where the flange is not provided.

6. The vehicle seat frame according to claim 1, further comprising
    a plurality of the collar members, wherein
    respective collar members are fitted to the respective end portions of the pipe member; and
    link members of a lifter mechanism configured to move the seat cushion frame up and down with respect to a floor are attached to the respective collar members.

* * * * *